(12) United States Patent
Reddy et al.

(10) Patent No.: US 8,531,693 B2
(45) Date of Patent: *Sep. 10, 2013

(54) PRINTER CONTROL DEVICE PROVIDING PRINTER MASQUERADING FEATURES AND RELATED METHODS

(75) Inventors: Paul James Reddy, Auckland (NZ); Julian Sharpe, Auckland (NZ); Jacky Sun, Auckland (NZ); Peter James Riddell, Auckland (NZ); Kevin Pickhardt, Pittsford, NY (US)

(73) Assignee: Pharos Systems International, Inc. DE (US)

( * ) Notice: Subject to any disclaimer, the term of this patent is extended or adjusted under 35 U.S.C. 154(b) by 753 days.

This patent is subject to a terminal disclaimer.

(21) Appl. No.: 12/437,813

(22) Filed: May 8, 2009

(65) Prior Publication Data

US 2010/0039662 A1 Feb. 18, 2010

Related U.S. Application Data

(60) Provisional application No. 61/051,375, filed on May 8, 2008, provisional application No. 61/168,766, filed on Apr. 13, 2009.

(51) Int. Cl.
*G06F 3/12* (2006.01)
*G06F 15/16* (2006.01)
*G06F 21/00* (2013.01)
*G06F 21/60* (2013.01)
*H04L 29/02* (2006.01)

(52) U.S. Cl.
CPC ............ *G06F 3/1296* (2013.01); *G06F 21/608* (2013.01); *H04L 29/02* (2013.01)
USPC .......................... 358/1.14; 358/1.15; 709/229

(58) Field of Classification Search
USPC ........ 358/1.13–1.15; 709/217–219, 223–225, 709/227, 229
See application file for complete search history.

(56) References Cited

U.S. PATENT DOCUMENTS

| | | | |
|---|---|---|---|
| 5,075,874 A * | 12/1991 | Steeves et al. | 358/1.13 |
| 5,511,149 A * | 4/1996 | Hayano | 358/1.13 |
| 5,568,594 A * | 10/1996 | Suzuki | 358/1.13 |
| 6,597,469 B1 * | 7/2003 | Kuroyanagi | 358/1.15 |
| 6,859,832 B1 * | 2/2005 | Gecht et al. | 709/219 |
| 6,920,506 B2 * | 7/2005 | Barnard et al. | 709/223 |
| 7,016,060 B1 * | 3/2006 | Carney et al. | 358/1.15 |

(Continued)

FOREIGN PATENT DOCUMENTS

| | | |
|---|---|---|
| EP | 1271302 | 1/2003 |
| WO | 02/33532 | 4/2002 |

*Primary Examiner* — Scott A Rogers
(74) *Attorney, Agent, or Firm* — Allen, Dyer, Doppelt, Milbrath & Gilchrist, P.A

(57) ABSTRACT

A computer network may include a network server, a network printer having a printer identifier associated therewith, and a plurality of network computers coupled to the network server for generating print jobs to be directed to the printer based upon the printer identifier. Each print job may have a printing permission level associated therewith. Moreover, the computer network may further include a printer control device coupled between the network server and the network printer and configured to determine the printer identifier associated with the network printer based upon printer communications, identify the printer control device to the network server using the printer identifier to access the print jobs from the network computers, and selectively enable printing of the print jobs by the network printer based upon the respective printing permission levels associated therewith.

24 Claims, 12 Drawing Sheets

(56) References Cited

U.S. PATENT DOCUMENTS

| | | | |
|---|---|---|---|
| 7,552,239 B2* | 6/2009 | Jean et al. | 358/1.15 |
| 7,719,709 B2* | 5/2010 | Akiyama | 358/1.15 |
| 2005/0007627 A1* | 1/2005 | Ha | 358/1.15 |
| 2006/0050294 A1* | 3/2006 | Smith et al. | 358/1.15 |
| 2006/0192997 A1* | 8/2006 | Matsumoto et al. | 358/1.15 |
| 2007/0282995 A1 | 12/2007 | Mizuno et al. | 709/223 |
| 2008/0151295 A1* | 6/2008 | Lee | 358/1.15 |
| 2008/0246986 A1* | 10/2008 | Scrafford et al. | 358/1.15 |
| 2010/0027054 A1* | 2/2010 | Reddy et al. | 358/1.15 |
| 2010/0198966 A1* | 8/2010 | Kaneko | 709/223 |
| 2010/0238477 A1* | 9/2010 | Tanaka | 358/1.13 |

* cited by examiner

```
┌─────────────────────────────────────────────────────────────┐ ⎫
│   SYSTEMS SECURE RELEASE    USER:    FRANKC1               │  │
│                             BALANCE: $1.00                 │  │
│  ┌───────┐┌─────┐┌─────────┐┌──────┐       ┌───────┐┌────┐ │  │ ─ 204
│  │REFRESH││PRINT││PRINT ALL││DELETE│       │ACCOUNT││EXIT│ │  │
│  └───────┘└─────┘└─────────┘└──────┘       └───────┘└────┘ │  │
│  ┌────────────────────────────┐ ┌─────────────────────────┐│  │
│  │PRINT JOBS                  │ │   SELECTED PRINT JOB    ││  │
│  │AUSTEN SEMINAR NOTES.DOC    │ │JOB NAME:  INTROPSYCH READ…││
│  │PSY_PROF_ROSS_LECTURE/PPT   │ │JOB OWNER: FCAICO         ││
│  │PHY146_PROBLEM_SET_5.DOC    │ │SUBMITTED: 03:39 PM MAR, 10││
│  │INTROPSYCH READING LIST.DOC │ │PAGES:     48             ││
│  │FILM HISTORY - FELLINI.PDF  │ │COST:      $4.80          ││
│  └────────────────────────────┘ └─────────────────────────┘│
└─────────────────────────────────────────────────────────────┘
```

FIG. 12

```
┌─────────────────────────────────────────────────────────────┐ ⎫
│   SYSTEMS SECURE RELEASE    USER:    FCAICO                │  │
│                                                            │  │─ 206
│  ┌───────┐┌─────┐┌─────────┐┌──────┐              ┌────┐   │  │
│  │REFRESH││PRINT││PRINT ALL││DELETE│              │EXIT│   │  │
│  └───────┘└─────┘└─────────┘└──────┘              └────┘   │  │
│  ┌──────────────────────────────────┐ △  ┌────────────────┐│
│  │PRINT JOBS                        │    │ SELECTED PRINT JOB││
│  │PRODUCT-REQUIRMENTS-FINAL.DOC     │    │JOB NAME: PRESS RELEASE V…│
│  │PRICE BOOK.XLS                    │1/2 │JOB OWNER: FCAICO│
│  │PRESS RELEASE V3.DOC              │    │SUBMITTED: 03:12 PM MAR, 10│
│  │NEW HIRE TRAINING.PPT [COMPATIBILITY MODE]│ │PAGES:    3 │
│  │VECTOR CONSULTING MARKET ANALYSIS.DOC│ ▽ │            │
│  └──────────────────────────────────┘    └────────────────┘│
└─────────────────────────────────────────────────────────────┘
```

FIG. 13

PRINTER CONTROL DEVICE PROVIDING PRINTER MASQUERADING FEATURES AND RELATED METHODS

RELATED APPLICATION

This application is based upon prior filed provisional application Ser. Nos. 61/051,375 filed May 8, 2008, and 61/168,766, filed Apr. 13, 2009, the entire subject matter of which is incorporated herein by reference in its entirety.

FIELD OF THE INVENTION

The present invention relates to document processing and reproduction systems, and, more particularly, to copy/print control systems and related methods.

BACKGROUND OF THE INVENTION

Many organizations wish to gain better control over their print environment because printing is a significant source of expenses, and one that is often difficult to manage. These costs come from a variety of printing practices, including the use of inkjets (which are relatively cheap to buy, but relatively expensive to run), inappropriate use of color (e.g., for draft documents, emails, personal files, etc.), and inappropriate use of devices (e.g., large runs sent to small workgroup printers rather than high volume reprographics centers).

A number of products in the market allow organizations to track the type of printing that occurs (such as Lexmark Markvision™, HP WebJetAdmin, Xerox® CenterWare™ Web and Pharos Blueprint®). Using this information, organizations can begin to phase out devices with a poor fit with respect to system usage requirements. However, changing user behavior is difficult when users are able to directly access printers on the network. Some existing approaches (e.g., Pharos® Uniprint®, EnvisionWare® LP:TOne, Equitrac® XYZ) can prevent users from accessing printers directly, and instead force them to print via these products' print servers—enabling the system administrator to set appropriate print policies.

All of these products have a potential disadvantage, namely that they require changes to the organization print environment, such as through installing components on the workstation, changing the print destination, installing software on the print server, and/or changing the print server queue configuration. Such products may also require the customer to make changes to the printer itself to remove the capability of users to print directly thereto.

SUMMARY OF THE INVENTION

In view of the foregoing background, it is therefore an object of the present invention to provide a computer network providing enhanced printer control features and related methods.

This and other objects, features, and advantages are provided by a computer network which may include a network server, a network printer having a printer identifier associated therewith, and a plurality of network computers coupled to the network server for generating print jobs to be directed to the printer based upon the printer identifier. Each print job may have a printing permission level associated therewith. Moreover, the computer network may further include a printer control device coupled between the network server and the network printer and configured to determine the printer identifier associated with the network printer based upon printer communications, identify the printer control device the network server using the printer identifier to access the print jobs from the network computers, and selectively enable printing of the print jobs by the network printer based upon the respective printing permission levels associated therewith.

More particularly, the printer control device may determine the printer identifier based upon Dynamic Host Control Protocol (DHCP) communications with the network printer. Additionally, the printer control device may determine the printer identifier based upon querying the network printer using a Simple Network Management Protocol (SNMP). Another approach is that the printer control device may determine the printer identifier based upon communications between the network server and the network printer.

By way of example, the printer identifier may comprise an Internet Protocol (IP) address, a Media Access Control (MAC) address, a network name, a network gateway, etc. In addition, the network server may comprise a network print server configured to queue the print jobs for the network server.

A printer control device, similar to the one described above, is also provided. In particular, the printer control device may include a printer access module and a network interface module cooperating therewith to: determine the printer identifier of the network printer based upon printer communications; identify the printer control device to the network server using the printer identifier to access print jobs generated by network computers coupled to the network server, where each print job has a printing permission level associated therewith; and selectively enable printing of the print jobs by the network printer based upon the respective printing permission levels associated therewith.

A related method for using a printer control device coupled between a network server and a network printer having a printer identifier associated therewith is also provided. The method may include: determining the printer identifier of the network printer based upon printer communications; identifying the printer control device to the network server using the printer identifier to access print jobs generated by network computers coupled to the network server, where each print job has a printing permission level associated therewith; and selectively enabling printing of the print jobs by the network printer based upon the respective printing permission levels associated therewith.

A physical computer-readable medium is also provided which may have computer executable instructions for causing a printer control device, coupled between a network server and a network printer having a printer identifier associated therewith, to perform various steps. The steps may include: determining the printer identifier of the network printer based upon printer communications; identify the printer control device to the network server using the printer identifier to access print jobs generated by network computers coupled to the network server, where each print job has a printing permission level associated therewith; and selectively enabling printing of the print jobs by the network printer based upon the respective printing permission levels associated therewith.

BRIEF DESCRIPTION OF THE DRAWINGS

FIGS. 10-13 are a series of printer screen prints showing configuration operations for a printer control device in accordance with an exemplary embodiment of the invention.

DETAILED DESCRIPTION OF THE EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable physical storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to exemplary embodiments of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 1:
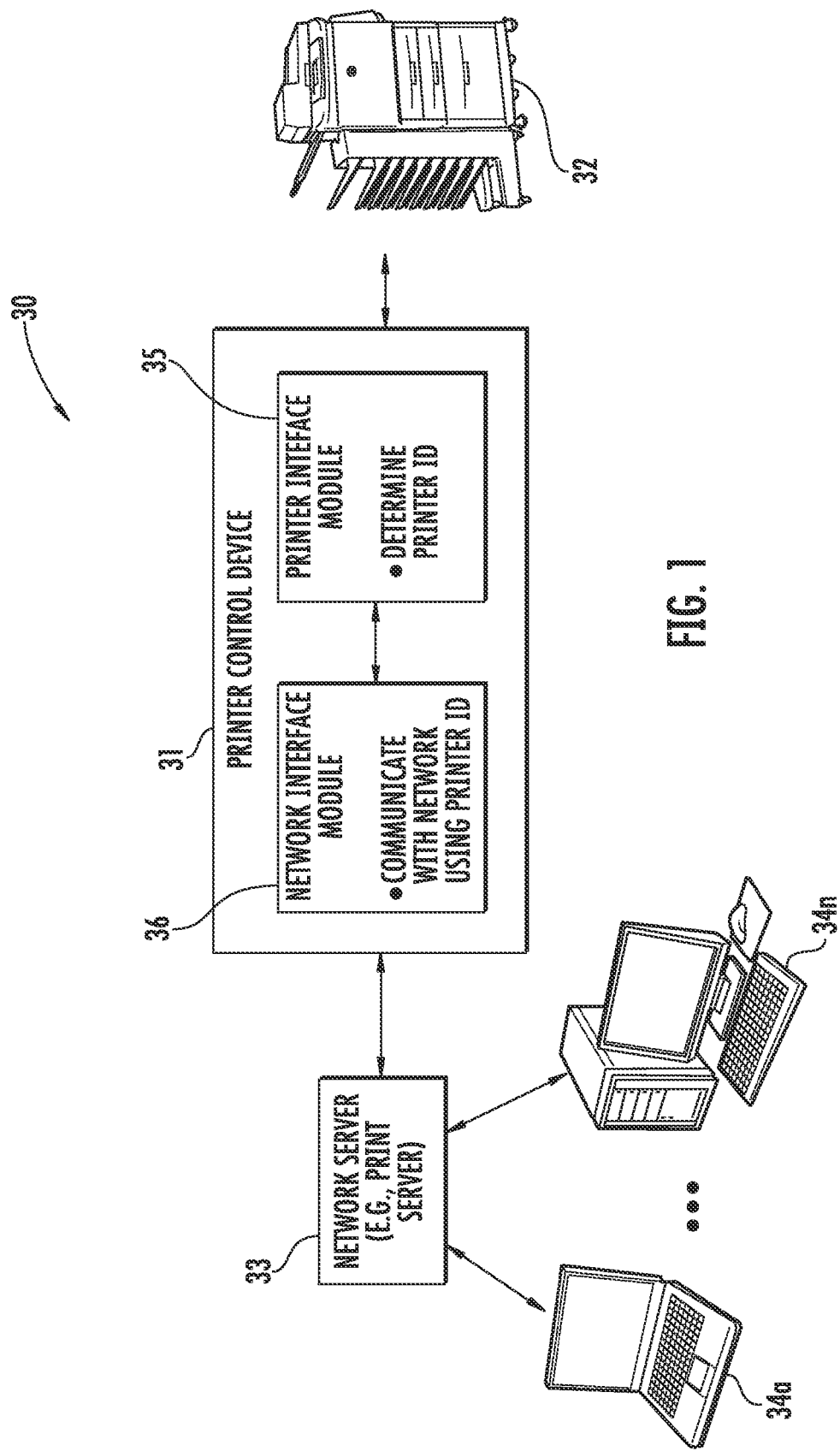
FIG. 1 is a schematic block diagram of a computer network including a printer control device providing printer masquerading features in accordance with one embodiment of the invention.
Figure 2:
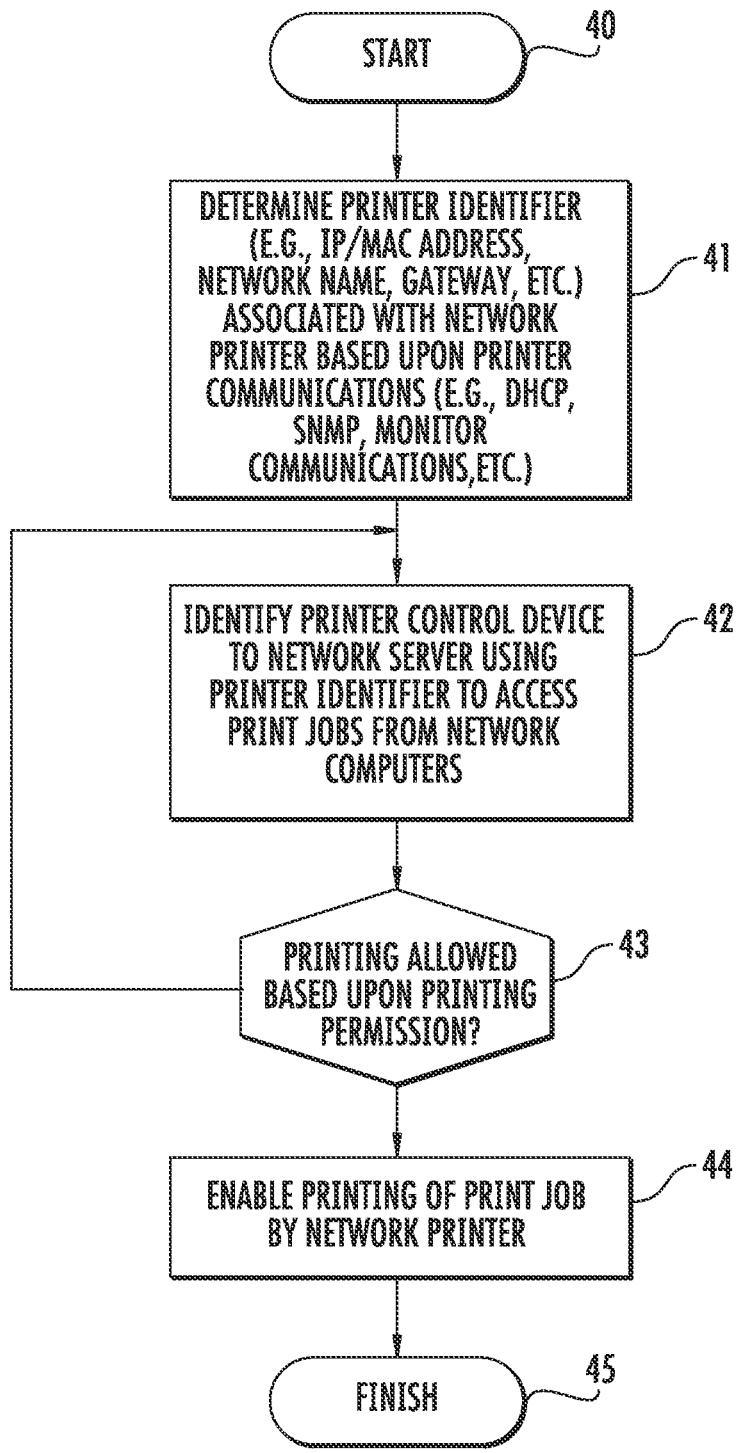
FIG. 2 is a schematic block diagram illustrating a method for using the printer control device of FIG. 1.
Figure 3:
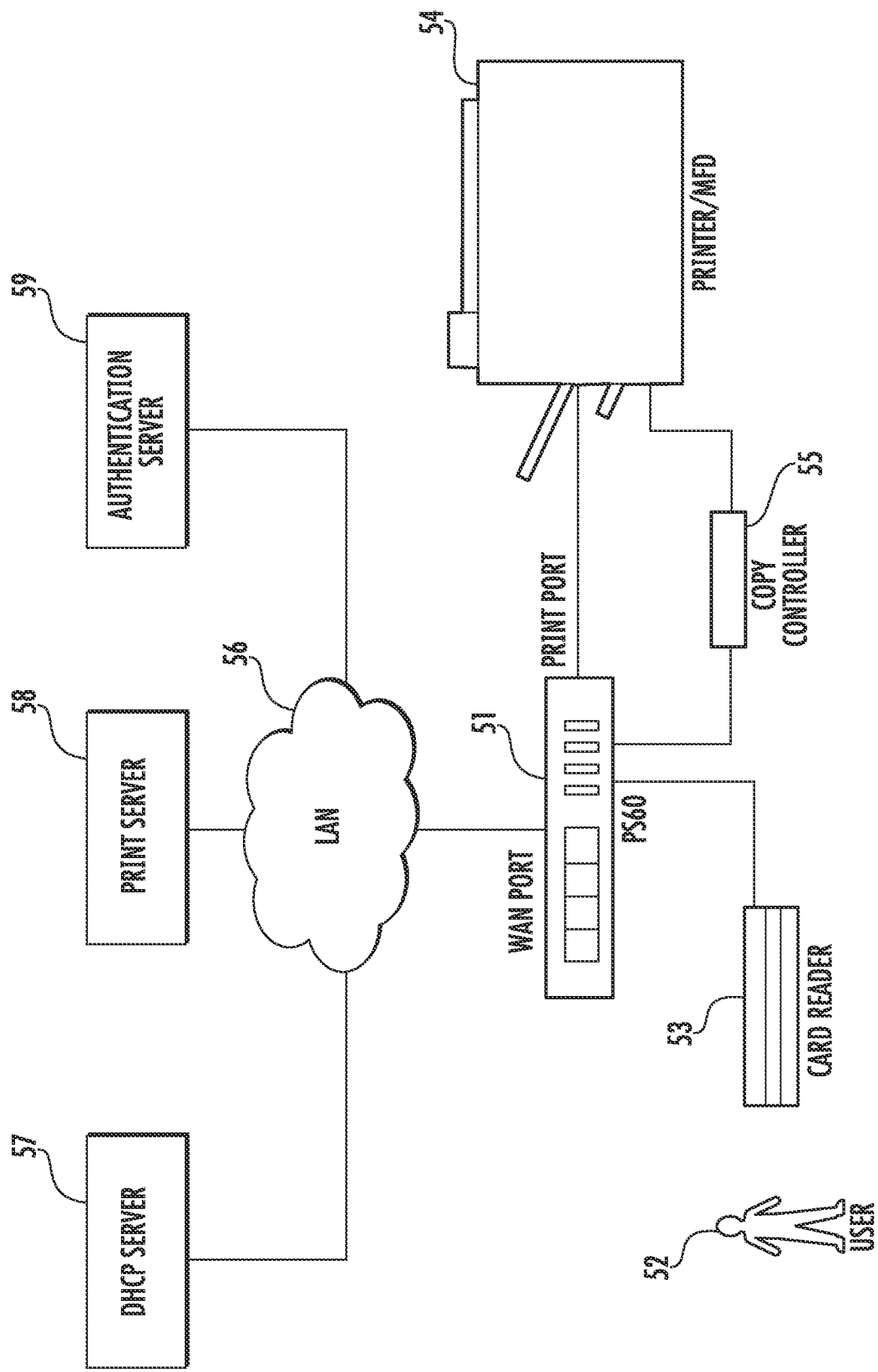
FIG. 3 is a schematic block diagram of an alternative embodiment of a computer network including a printer control device in accordance with the invention.

Referring initially to FIGS. 1 and 2, an exemplary computer system or network 30, which illustratively includes a printer control device 31, and associated methods, are first described. The printer control device 31 advantageously provides for taking control of one or more network printers 32 connected together in a network, such as a Local Area Network (LAN), for example, with a network server 33. By way of example, the network server 33 may be a print server, although other network server devices may also be used in addition to a print server, as will be appreciated by those skilled in the art. The printer control device 31 advantageously allows the printer 32 to be used for printing print jobs generated by network computers 34a-34n without the need for configuration changes to the printer, and without changing the printer's availability to network administration.

As used herein, "printer" may include job processing devices such as laser/inkjet printers, copiers with printing capabilities or multi-function devices (MFDs), fax machines, etc. That is, "printer" is generally intended to include various types of printing devices that can print documents from a computer or electronic file, as will be appreciated by those skilled in the art. The network computing devices 34a-34n may be PCs, laptops, Macs, PDAs, etc., for example, and are illustratively coupled to the network print server 33, which queues the print jobs generated by the network computers for printing by the printer 32 (and potentially other network printer as well), as will also be appreciated by those skilled in the art.

The printer control device 31 advantageously provides a way to control access to one or more printers 32 without requiring changes to the network print environment, and without adding a potentially large number of new devices to the network 33 that need management. Considered in different terms, the printer control device 31 performs "printer masquerading." The underlying method for doing this is to add the printer control device 31 between the printer 32 and LAN 33 so that the printer control device can control access to the printer, and also double as an identification system and print/copy control system. That is, the printer control device 31 masquerades as the printer 32, and therefore looks to the rest of the network 33 devices as if it were in fact the printer.

The printer control device illustratively includes a printer interface module 35 and a network interface module 36. In accordance with a first implementation, the printer control device 31 is first connected between the printer 32 and the network 33, and the printer interface module 35 attempts to determine or automatically ascertain the printer IP configuration, at Blocks 40-41. That is, the printer interface module 35 determines the respective identifier(s) associated with the printer 32 used to address the printer over the network 30, and use this identifier to identify itself to the networks server 33, thereby masquerading as or mimicking the printer 32. The printer interface module 35 may do this via a number of techniques, such as the following:

1. Running a Dynamic Host Control Protocol (DHCP) service available on the printer's network port. If the printer is using DHCP, then the printer control device 31 may directly query the MAC Address and network name of the network printer 32. Plus it knows that the printer uses DHCP.
2. Querying the printer 32 using one or more of zeroconf/rendezvous/SNMP (Simple Network Management Protocol) or other suitable broadcast protocols. If the printer 32 is using some (as yet) unknown static IP configuration, then it will respond to the broadcast. This response may be used to: (a) find the IP address of the printer 32; and/or (b) query it for IP configuration, MAC address, network name, etc.
3. Entering a hub mode and monitoring the traffic originating from the printer 32 to the network server 33, which tells the printer interface module 35 what the printer's IP address is. The printer interface module 35 may then use SNMP (or other suitable protocol) to retrieve the printer's IP configuration.

Once the MAC address, network name, IP address, mask, and/or gateway, etc., of the printer 32 is known, the network interface module 36 of the printer control device 31 configures an external port thereof to match these characteristics, so that the network interface module may advantageously communicate with the network server 33 by identifying itself with the given printer identifier(s) to access print jobs, etc., at Block 42. If the printer 32 is using DHCP, then the printer control device 31 will look just like the printer to network services such as DHCP and printing. The printer control device 31 is assigned the same IP address that the printer 32 would otherwise have been assigned, and may respond to the same network name. If the printer 32 is using a static IP address, then the printer control device 31 may use those same static IP configuration options (IP address, mask, etc.) and will connect to the LAN 33 accordingly.

In accordance with one exemplary configuration, all traffic to the printer 32 will be received by the printer, with the exception of a specific management port that is used to communicate to the printer control device 31 itself, although other configurations are also possible. When the printer control device 31 connects to its controlling print server, it stops forwarding all print jobs from the LAN 33 to the printer 32 and only permits appropriate print traffic from the printer server to arrive at the printer. That is, the printer interface module 35 and network interface module 36 advantageously cooperate to selectively enable printing of the print jobs by the network printer 32 based upon respective printing permission levels associated with the print jobs, at Blocks 43-44, thus concluding the method illustrated in FIG. 2 (Block 45). By way of example, the permission levels may be based upon whether a user is authorized to print documents with certain job attributes (e.g., color, duplex, stapled, bound, etc.), whether a user is authorized to print to a particular printer (e.g., whether the printer is in a secure area, etc.), user account balances, etc., otherwise, as will be appreciated by those skilled in the art.

Another method of managing connections to the printer 32 is to use the concept of a hub, and to not have any network presence (i.e., a print server) at all. In this configuration, traffic from the network server 33 is collected by the printer control device 31 and forwarded to the printer 32, and traffic from the printer is forwarded to the network server. Outbound traffic from the printer 32 will inform the printer control device 31 what the IP address of the printer is, and then an appropriate query technique may be used to collect the rest of the detail about the printer (such as SNMP), as will be appreciated by those skilled in the art.

Inbound traffic to the printer 32 that is inappropriate (such as a user trying to print directly to the printer) may be dropped or excluded in accordance with the configuration rules set up for the printer control device 31 by the network administrator. Exemplary configuration techniques for the printer control device 31 will be discussed further in the examples provided below. Inbound traffic that the printer control device 31 (such as EDI queries) allows may be collected and responded to directly from the printer control device 31 using the printer's IP address, for example.

Further details of the printer control device 31 and associated method aspects will be understood with reference to exemplary embodiments thereof set forth in FIGS. 3-7. In the exemplary system illustrated in FIG. 3 and method steps illustrated in FIGS. 4-7, the printer control device 31 is referred to as a "PS60." In the network 50 illustrated in FIG. 3, the PS60 51 does not have a direct interface for a user 52 per se, but instead receives user input from a token or card reader 53 (e.g., for reading a user identity token, card, etc.). However, in different embodiments one or more other suitable device interface options may be used instead of (or in conjunction with) the card reader, such as: (1) pushing a message to the printer screen from the masquerading controller; (2) sending error messages by submitting a print request through the printer (i.e., to paper); (3) sending an email confirmation/error to the registered end user; (4) sending an instant message (IM) to the registered end user, including the possibility of directly to a mobile device; (5) computer audio through the device, etc.

The network 50 further illustratively includes a printer/MFD 54 and controller 55 for controlling copy operations, as will be appreciated by those skilled in the art. Here again, the various components are connected together by a LAN 56 (i.e., a network server providing network routing, as will also be appreciated by those skilled in the art). Moreover, various servers may also be connected to the LAN 56, including a DHCP server 57 and print server 58 for performing the above-described operations, as well as an authentication server 59 for authenticating users for copying and printing operations based upon permission levels, account balance, authorization level, etc. Various applications may be used to implement the print and authentication server functionality, such as Pharos Blueprint® and Pharos Uniprint®/Off-The-Glass®, as will be discussed further below.

Another advantageous feature is that secure access may be provided through encryption/decryption directly to the desktop and by limiting access through a PS60 to only the MAC address of the specific printing device authorized. Moreover, the network 50 may also be secured for output devices such that no printing devices may be printed to that do not pass through a PS60. In some embodiments, a respective PS60 51 may be assigned to each network printer 54, and each PS60 may be registered to a library(ies) as part of its terminal setup, and may therefore advantageously access stored demand reprint jobs at specific devices (e.g., forms, manuals, brochures, etc.), as will be appreciated by those skilled in the art.

Figure 4:
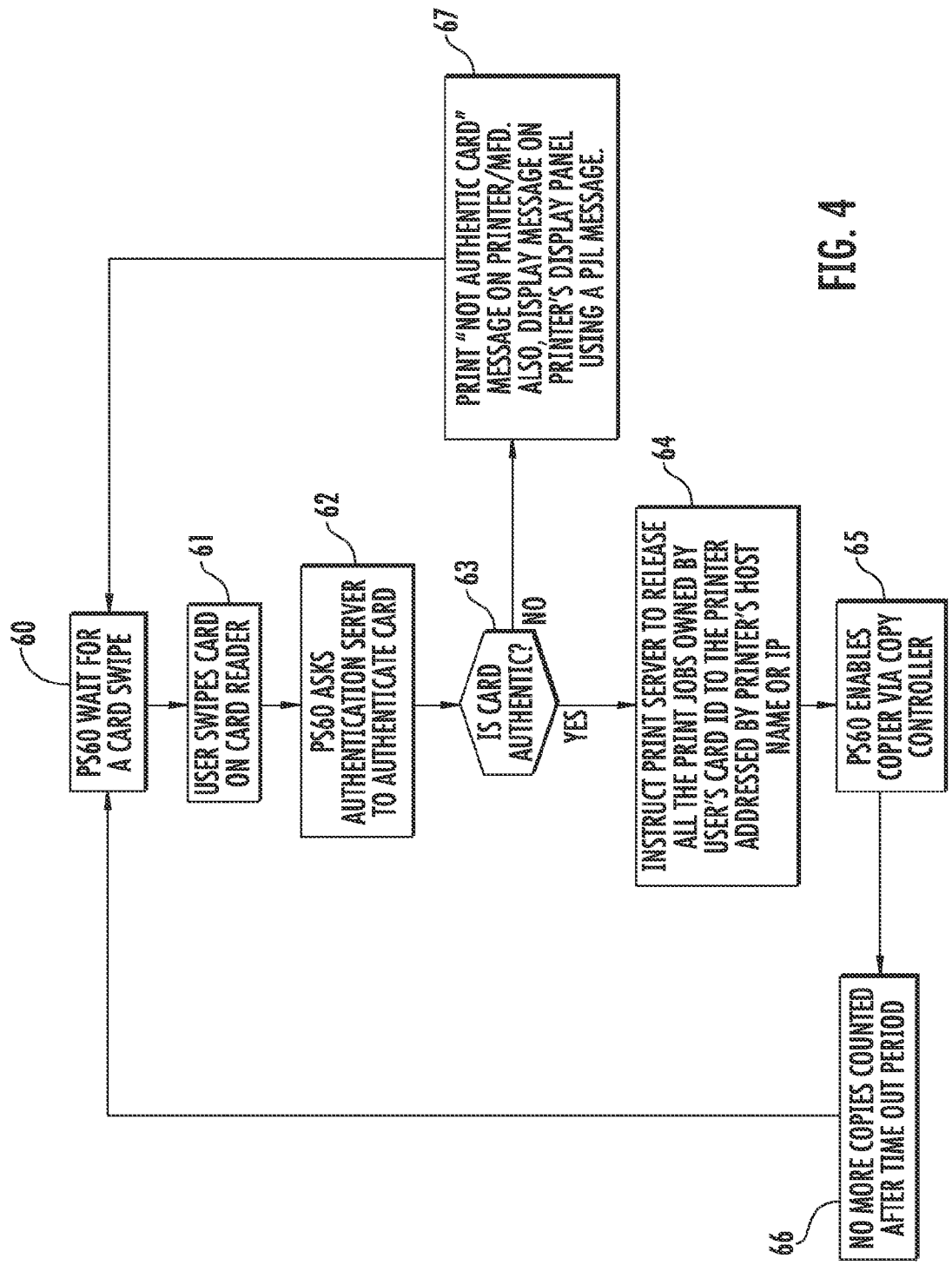
FIG. 4 is a flow diagram illustrating normal user operation method steps associated with the network of FIG. 3.

In accordance with one exemplary model, operation may begin when the user first swipes his card or token at the reader 53, at Blocks 60-61 (FIG. 4). Upon authentication by the authentication server 59, at Blocks 62-63, the print server 58 is instructed to release some or all of the user's print jobs as appropriate, at Block 64, and the PS60 51 enables the MFD/copier to print same, at Block 65. If no more copies are counted after a given time out period, at Block 66; the PS60 51 times out and waits for the next card swipe. On the other hand, if the user is not authenticated, a "not authentic card" message may be printed on the primary display of the printer/MFD 54 (or other display), at Block 67.

By way of example, each swipe of the user's card may release jobs as follows: (1) release all jobs in the queue for the user; (2) release the most recent (or oldest) job(s) left in the queue; (3) each swipe releases the most highly prioritized job in queue—based on any defined priority (this can be used in a manufacturing setting to reorder work orders, for example); (4) two (or more) swipes within x seconds releases all print jobs (1 swipe releases 1 print job); or (5) jobs are only releasable for a predefined period at the PS60 printers, but held for a longer period of time at higher functionality devices that can list the jobs. Of course, operational needs may also be accommodated, and other swiping/printing configurations may also be used.

Another option is notifying/managing jobs using a user interface at the client workstation. With respect to notification, a user may swipe his/her card, but no jobs appear. Returning to his/her workstation, the print user interface informs the user that he/she does not have permission to print the color job to the selected printing device, for example. As for job management, one potential scenario is that the user right clicks on a print icon in a system tray. The user selects "manage waiting jobs" or similar menu selection. A user interface is displayed to allow the user to delete a second copy of the document waiting to be printed. The user may also perform other operations, such as making waiting jobs available to other staff members, etc.

Figure 5:
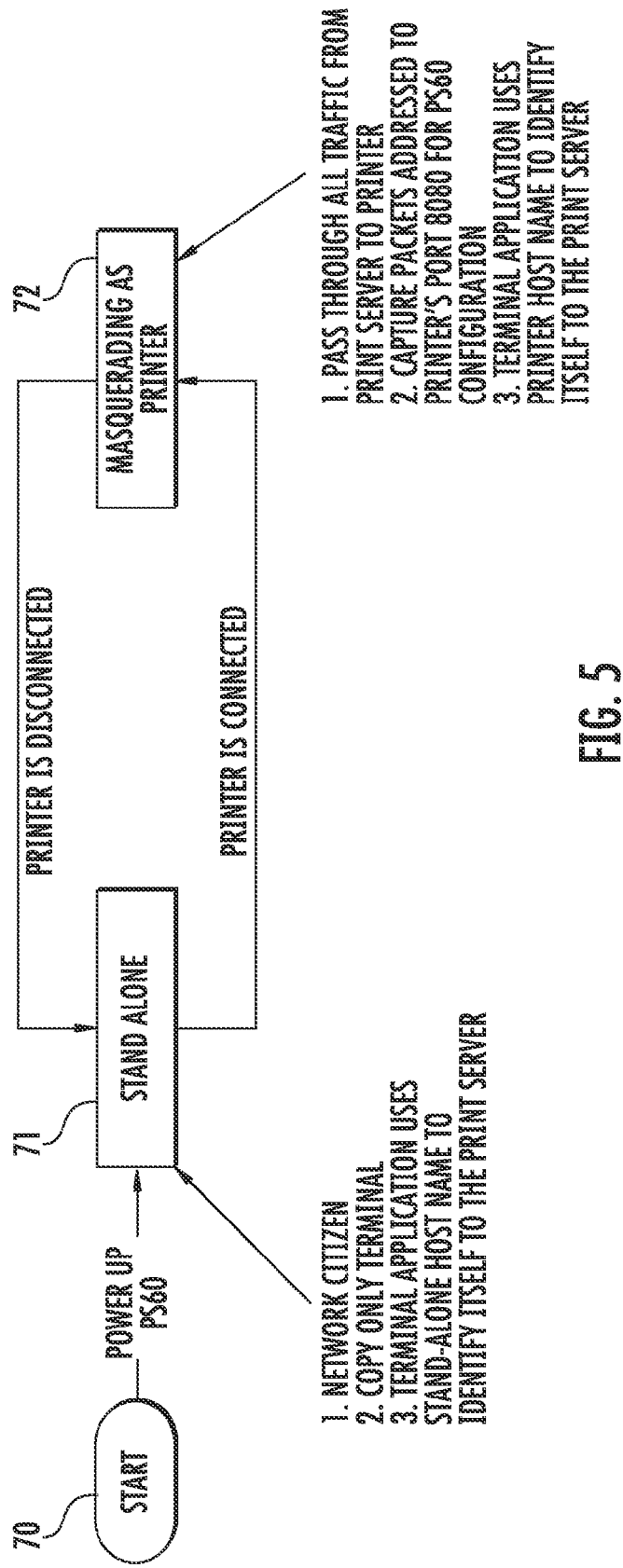
FIG. 5 is a schematic block diagram providing a relatively high-level state transition view of the printer control device of FIG. 3.

FIG. 5 illustrates exemplary operational states of the PS60 51. Beginning at Block 70, the PS60 51 is powered up and can operate in a stand alone mode when the printer 54 is disconnected (Block 71), or masquerade as the printer when the printer is connected, at Block 72, as discussed above. In the stand-alone mode, the PS60 51 may function as a network "citizen" or hub, a copy only terminal, or provide a terminal application that uses a stand-alone host name to identify itself to the print server 58. In the masquerading or connected mode, the PS60 51 may perform the following functions: pass through traffic from the print server 58 to the printer 54; capture packets addressed to the printer's port (e.g., 8080) for PS60 configuration; and a terminal application which uses the printer host name to identify itself to the print server. In some embodiments, ZeroConf may be used, for example, to advertise Web configuration server availability via the current IP address, as will be appreciated by those skilled in the art.

Figure 6:
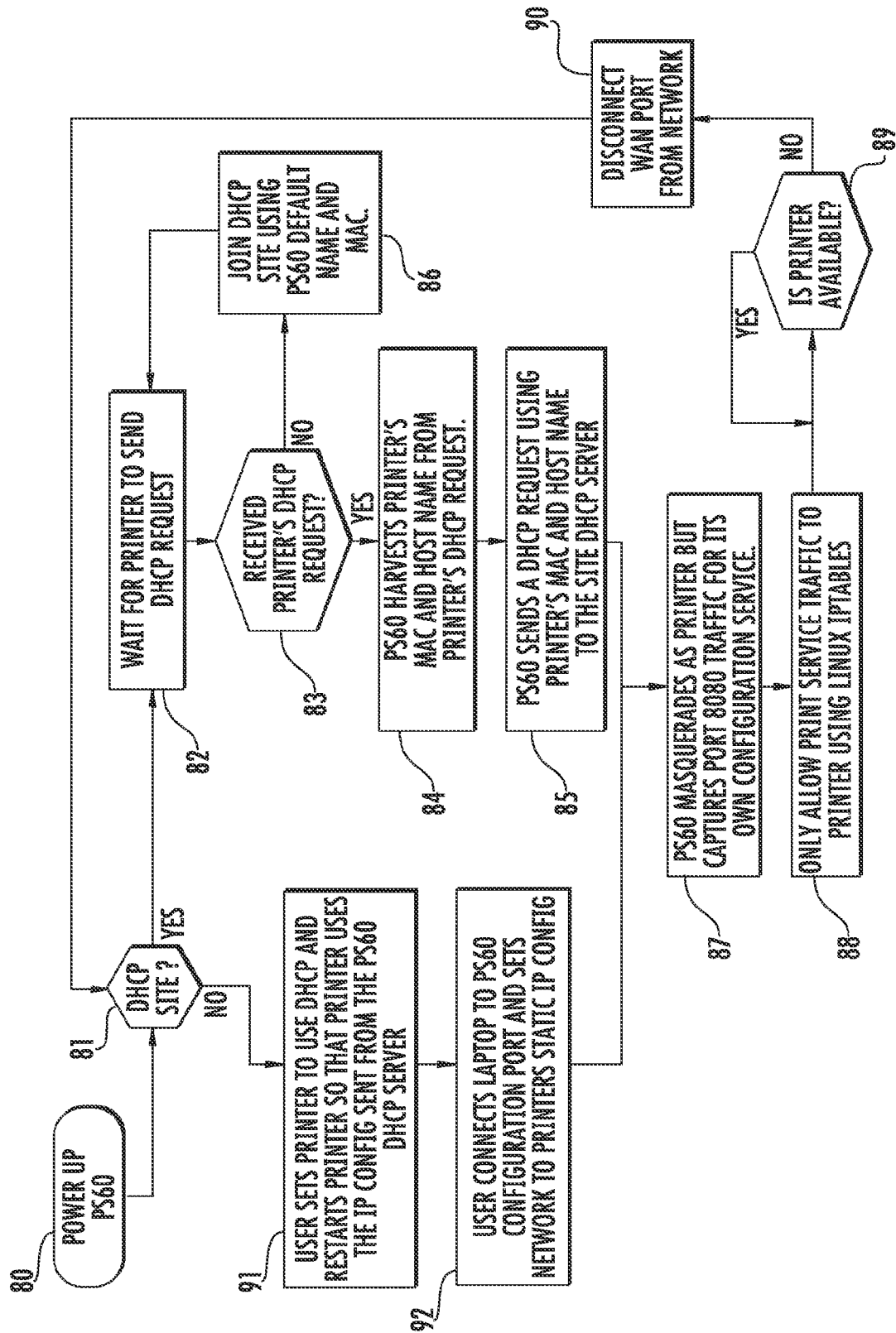
FIG. 6 is a flow diagram illustrating a printer masquerading implementation of the printer control device of FIG. 3 using Linux firewall and network address translation (NAT).

Referring to FIG. 6, a printer masquerading implementation of the PS60 51 using a Linux firewall and network address translation (NAT) is now described. Upon power up of the PS60 51 (Block 80), if a DHCP site is recognized (Block 81), then the PS60 waits for the printer 54 to send a DHCP request, at Blocks 82-83. If no DHCP site is recognized, the user sets the printer 54 to use DHCP and restarts the printer so that the printer uses the IP configuration sent from the PS60 51 to the DHCP server 57, at Block 91. Further, the user connects a computer (e.g. laptop) to the PS60 57 configuration port and sets it to the desired printer state 18 configuration (discussed further below), at Block 92. Once received, the PS60 51 harvests the MAC address and host name from the printer DHCP request, at Block 84, and sends a DHCP request using the MAC address and host name of the printer 54 to the DHCP server 57, at Block 85. Otherwise, if the DHCP request is not received by the printer 54 after a designated amount of time, then the PS60 51 may join the DHCP site using a default name and MAC address, at Block 86. The PS60 51 masquerades as the printer 54, but captures communications or traffic from a designated port (e.g., port 8080) for its own configuration, at Block 87, and only allows print server traffic to the printer based upon the appropriate permission levels, as noted above, at Block 88, if the printer is available (Block 89). By way of example, the permission levels may be specified in Linux IPTABLES in some embodiments, but other suitable table or database configurations may also be used, as will be appreciated by those skilled in the art. If the printer 54 is unavailable, the PS60 51 may optionally disconnect its WAN port from the LAN 56, if desired, at Block 90.

Figure 7:
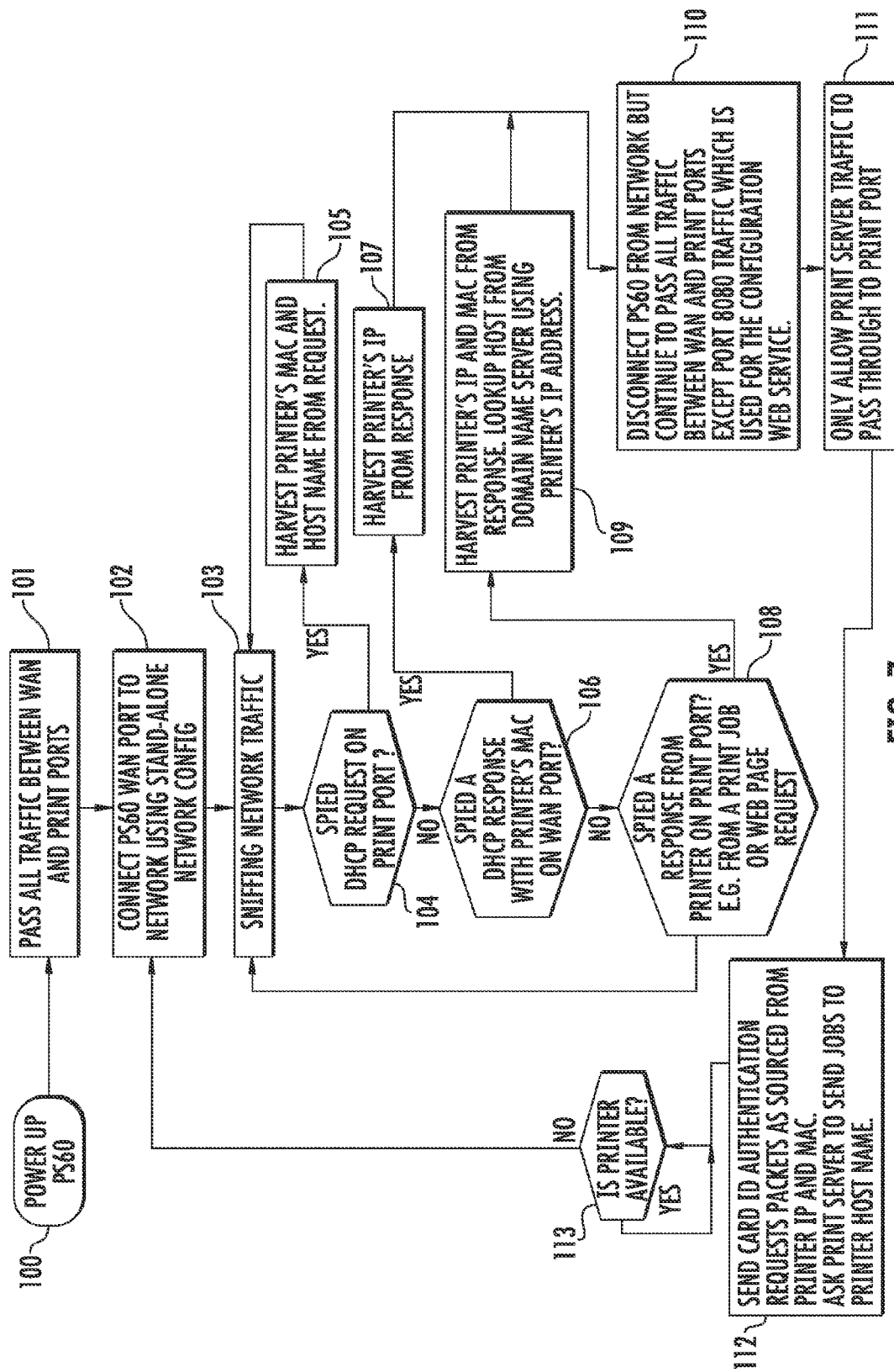
FIG. 7 is a flow diagram illustrating a printer masquerading implementation of the printer control device of FIG. 3 using a hub/proxy modification.

Referring further to FIG. 7, a printer masquerading implementation of the PS60 51 using a hub/proxy modification is now described. Upon power up of the PS60 51, at Block 100, all traffic between the WAN and print ports is passed (Block 101), and the PS60 51 WAN port is connected to the network 56 using a stand-alone network configuration, at Block 102. Observation or "sniffing" of network traffic then commences, at Block 103, and if a DHCP request is noticed on the printer port (Block 104), then the printer MAC and host name are harvested from the request, at Block 105. Otherwise, if a DHCP response is observed with the printer MAC on the WAN port, at Block 106, then the printer's IP address is harvested from the response, at Block 107. If neither of the foregoing DHCP communications is observed, the PS60 also looks to observe a response from the printer 54 on the print port (e.g., from a print job or Web page request), at Block 108, from which the printer's IP and MAC addresses may be harvested, at Block 109. Moreover, the host may be looked up from a domain name server using the printer's IP address.

Once the printer identification information is obtained, the PS60 may be disconnected from the network 56, but sill continue to pass traffic between the WAN and print ports, with the exception of administrative traffic on a designated port (e.g., 8080) which is used for the configuration Web service, as noted above (Block 110). Moreover, only print server traffic is allowed to pass through the print port, at Block 111. When a user swipes his or her card or token, the PS60 51 sends card identification authentication request packets from the printer IP and MAC addresses, and requests that the print server sends jobs to the print host name. The foregoing steps illustrated at Block 102-112 may be repeated when the printer becomes unavailable, at Block 113.

In accordance with a further aspect of the invention, Web server functionality may optionally be implemented in the PS60 device as well (with or without the above noted masquerading functionality). By way of background, for certain MFDs, a common architecture for the user interface of an embedded application is a Web page managed at the MFP via a web server. This configuration is common for a number of copier manufacturers. However, this configuration has certain drawbacks. For example, it does not scale well, it may expose security issues, and it potentially opens the network on which the MFP is installed to invasion problems such as viruses, worms, etc.

Figure 8:
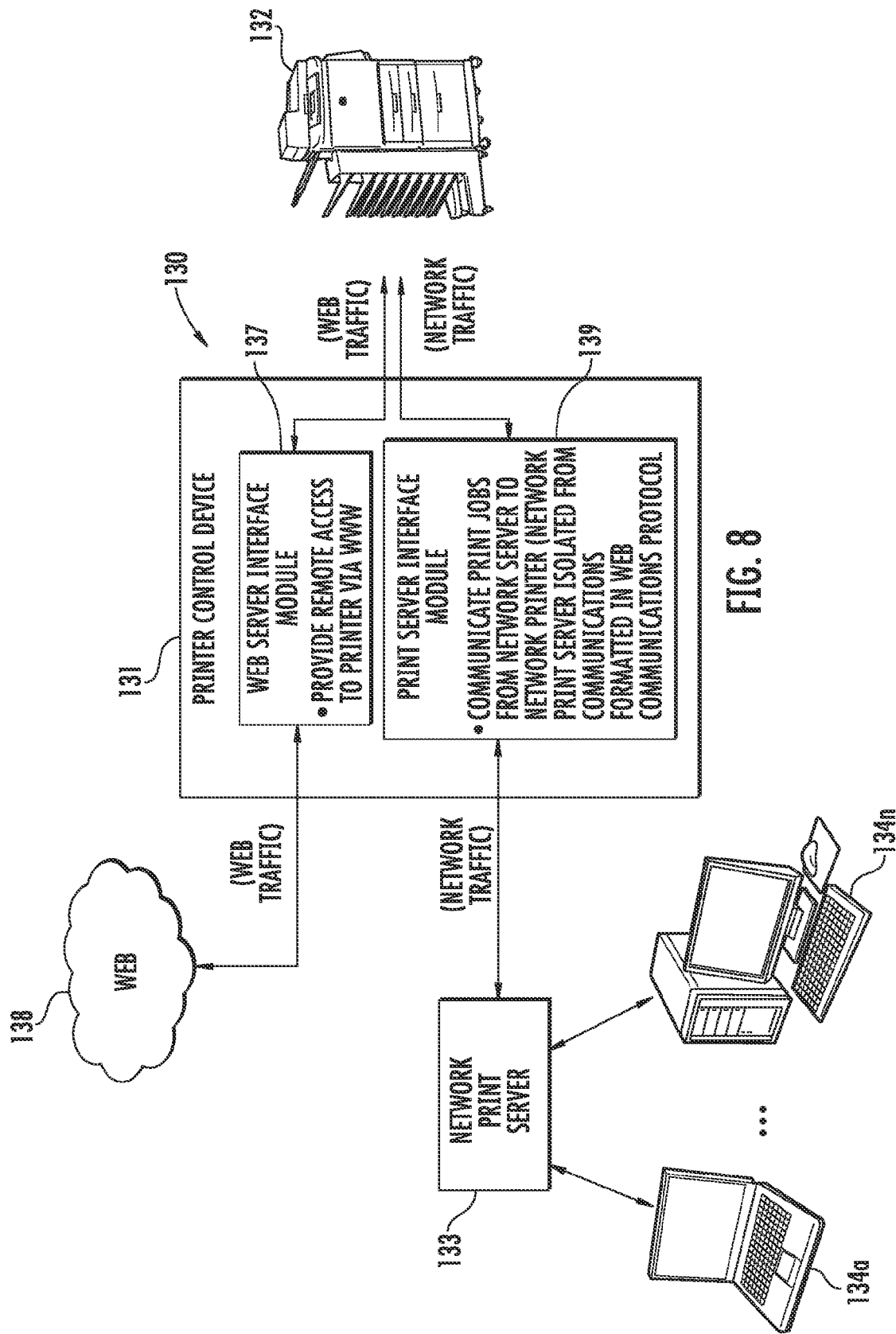
FIG. 8 is a schematic block diagram of another computer network embodiment including a printer control device providing Web server interface features in accordance with the invention.
Figure 9:
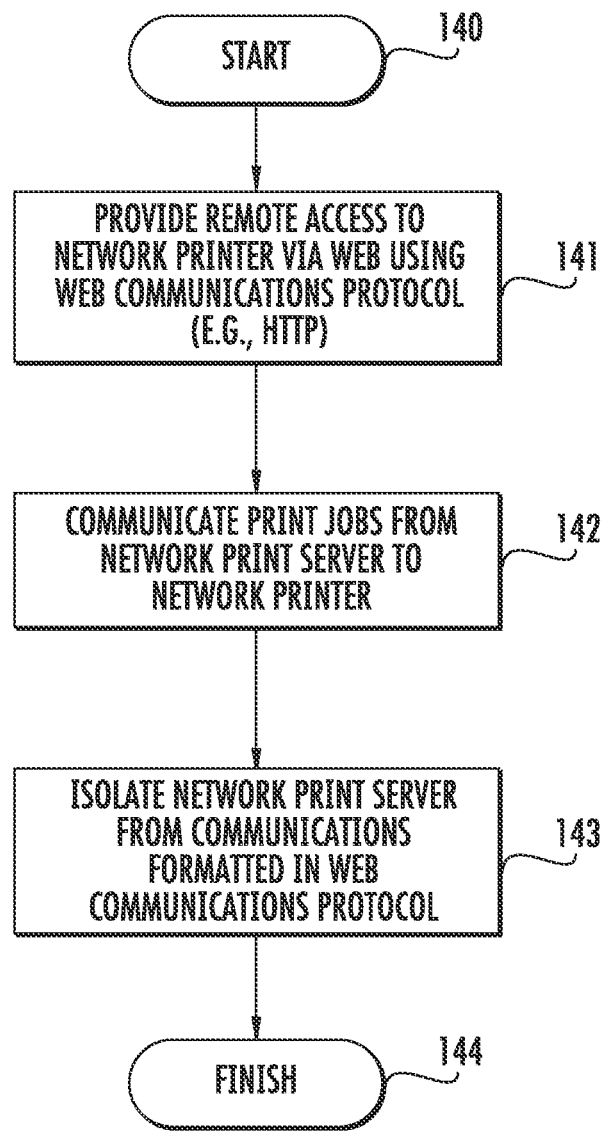
FIG. 9 is a schematic block diagram illustrating a method for using the printer control device of FIG. 8.

Referring initially to FIGS. 8 and 9, a computer system or network 130 including a printer control device 131 which implements Web server functionality and associated methods are now described. The network 130 illustratively includes one or more network printers 132, a plurality of network computers 134a-134n for generating print jobs for the network printer(s), and a network print server 133 coupled to the network computers for queuing the print jobs for the network printer, as similarly discussed above. The printer control device is coupled between the network print server 133 and the network printer 132, and it includes a Web server interface module 137 configured to provide remote access to the network printer via the Web (www or Web) using a Web communications protocol (e.g., HTTP, HTML, XML, etc.), at Blocks 140-141. As used herein, "Web" is meant to include the World Wide Web and/or Internet, as these terms are commonly used interchangeably. The printer control device 131 further illustratively includes a print server interface module 139 configured to communicate the print jobs from the network print server 133 to the printer 132, at Block 143. More particularly, the Web server interface module 131 and print server interface module 139 are advantageously configured to isolate the network print server 133 from communications formatted in the Web communications protocol, at Block 143, thus concluding the method illustrated in FIG. 9 (Block 144).

In one exemplary implementation, the Web server functionality is distributed to respective PS60 interface devices, in contrast to prior art configurations in which a separate, centralized single server services many nodes, i.e., computers/computing devices, MFDs, etc. This approach employs a single Pharos PS60 that acts as the Web server or Web master for the printer's Web page, or is the feeder that controls the Web page for a single printing device (e.g., MFP). That is, there is a one-to-one Web server to MFP relationship because each respective PS60 serves as a Web server for its respective printing device. However, it will be appreciated that in some embodiments more than one PS60 may be assigned to multiple printing devices (i.e., a one-to-many relationship), if desired. The one-to-one relationship may be helpful where the PS60 also provides authentication token or card reading capabilities for respective devices, for example.

The Web server enabled PS60 thus advantageously helps to isolate the computer network from the Web server services so that the only data sent on the computer network through the print server 133 is the "business logic traffic", i.e., print job and printer control data. The Web page network traffic is isolated to a private network shared only by the network appliance, the PS60, and the MFP. For example, this may be the cable between the PS60 and the MFP. The PS60 is the network appliance, and it has a one-on-one designated relationship that is secured with the MFP. All other corporate network traffic, such as the business logic, is specific for the application, i.e., specific for the relationship of the PS60 and MFP, for example.

The above-described approach may advantageously address the noted scalability issues, reduce the peak load-time impact on the network, and reduce network traffic (i.e., since HTTP traffic need not be transmitted through the print server, etc.). Moreover, this approach may be significantly easier to maintain, support, and configure for specific MFP uses and design features. As such, scalability and speed may be enhanced with a potential reduction in demand degradation, security holes, and interference problems such as worms, viruses, etc., and enhanced user response may also be realized.

Additional aspects of the invention will be appreciated with reference to an exemplary implementation thereof discussed in conjunction with FIGS. 10-13, in which the printer control device provides Web server functionality. In the following description of this exemplary embodiment, the printer control device is referred to as a "PSX" device. The PSX includes hardware and software components and advantageously interfaces with Pharos Blueprint® and Pharos Uniprint®/Off-The-Glass® to provide photocopying and print job release services from Xerox® EIP-enabled multi-function printers (MFDs). User activity is tracked and recorded in the Pharos® Database. Printing and copying may be optionally charged for. The Pharos® PSX components include two main components. The first is a PSX AuthHub, which is a relatively small, stand-alone device or "box" that connects to the network and a Xerox® EIP-enabled printer (although in other embodiments the PSX could be similarly configured to work with other printers). The PSX AuthHub interfaces with the Pharos® system to control printing and copying and record printing/copying transactions.

The second main component of the PSX is the Pharos® Omega SmartLink for Copy, which is an assembly that connects the PSX AuthHub to the Xerox® EIP-enabled printer it controls. The SmartLink includes an Omega CopyLink interface, a Copy Adapter and a USB cable. As Copy Adapters connect to the printer's Foreign Device Interface (FDI), they may be custom made for each type of copier they are to be attached to, although in some embodiments they may be configured to connect to other interfaces besides FDIs. These AuthHub and SmartLink components are connected to the network, as well as the printer, to manage, track and charge for printing and/or copying.

To provide security for the Web server functionality of the PSX, certificates from a certification authority and secure socket layers (SSLs) may advantageously be configured for the PSX. To install the CA certificate on the Web browser, in many cases a user will have already installed a CA certificate on the EDI Server machine during the installation thereof. If not, then the user may follow the steps below:

1. Go to the EDI Server PC.
2. Open Internet Explorer.
3. Go to Tools menu>Internet Options>Contents tab and click on the Certificates button.
4. Click Import.
5. Click Next at the Wizard welcome screen.
6. Click Browse to locate the Pharos CA Certificate in the server\EDI directory of the Pharos CD. Click Next.
7. In the Certificate Store screen select 'Place all certificates in the following store' and click Browse.
8. Check the Show Physical Stores box.
9. Under Trusted Root Certification Authorities, highlight Local Computer and click OK.
10. Click Next.
11. Click OK.
12. Close the Certificates window.

The following steps are taken to generate a Server Certificate Request:

1. Open the Internet Services Manager (Start menu>Programs>Administrative Tools).
2. Double-click on the Server machine to display the list of Web Sites.
3. Right-click on the Web Site on which you want to enable encryption (e.g. Default Web Site) and click Properties.
4. Click the Directory Security tab, and then click Server Certificate to start the Web Server Certificate Wizard.
5. Click Next to start the wizard, and select 'Create a new certificate'.
6. Click Next, and select 'Prepare the request now, but send it later'.
7. Click Next, and give the certificate a name. The name may be matched with the name of the Web Site. Now, select a bit length; the higher the bit length, the stronger the certificate encryption.
8. Click Next, and type the Organization and Organizational Unit (these values do not need to match any Active Directory entries).
9. Click Next, and enter the Common Name. Note: Server certificates are specific to the Common Name that they have been issued to, so it is important that the common name is correct. The Common Name should be the same as the Web address being accessed when connecting to the secure site. Common names are typically composed of Host+Domain Name and will look like "www.your-site.com" or "yoursite.com". For example, a server certificate for the domain "domain.com" will receive a warning if accessing a site named "www.domain.com" or "secure.domain.com". If the Certificate will be used on an intranet (or internal network), the Common Name may be one word, which may be the name of the server.

10. Click Next, and type the country, state, and city or locality.
11. Click Next, and select a location and file name to save your request to.
12. Click Next twice, and then click Finish to close the wizard. This places the text file (called certreq.txt by default) into the location specified in step 11. The request can now be emailed to Pharos Systems at support@pharos.com Once the Server Certificate is received from Pharos Support, it may be installed as follows:
1. Open the Internet Services Manager (Start menu>Programs>Administrative Tools).
2. Right-click the Web Site on which you want to enable SSL, and click Properties.
3. Click the Directory Security tab, then click Server Certificate to start the Web Server Certificate Wizard.
4. Click Next, and select 'Process the pending request and install the certificate'.
5. Click Next, and Browse for the path and file name of your certificate.
6. Click Next twice, and then click Finish to complete the wizard.
7. Click the Directory Security tab, click in the "Secure communications" box click Edit.
8. On the dialog that opens, check the Require secure channel (SSL) box.
9. Make sure that the default 'Ignore client certificates option' is selected, then click OK.
10. Click the Web Site tab, and make sure that the SSL Port text box is populated with the desired port SSL should run on. The default (and recommended) port is 443.
11. Click OK to close the Web site Properties dialog box and close all windows.

The PSX system may be configured as follows. Networking details and options that affect the physical operation of the PSX AuthHub may be set on the PSX Administrator web pages. Furthermore, settings that affect how the PSX device operates in the Pharos® system are set in the Network Terminals context of the Pharos® Administrator application (i.e., on the network server or print server running the Pharos Blueprint®/Uniprint®/Off-the Glass® programs). Regarding the configuration Options in the Pharos Administrator, all PSX devices may exist as a Network Terminal in the Pharos Administrator. Network Terminals are configured in the Release Stations>Network Terminals context. It should be noted that the PSX configuration schema may be applied to the Pharos Database to add the "PSX" Network Terminal type and its associated configurable properties. A script may be applied to the Pharos Database from the Pharos EDI screen of the Omega Administrator web application.

The following configuration options may be used:
Name—the Network Terminal is displayed under this name in the List Window. This name may be the same as the PSX device's Host Name, which is displayed on the Overview screen of PSX Administrator.
Descriptive Name—the Descriptive Name may be used to give further information about the Network Terminal. It is displayed only in Pharos Administrator.
External Name—in cases where the Network Terminal is interfacing with an external system via a Pharos® Gateway, the external name contains the terminal's identifier in the external system.
Station Type—a Network Terminal can be one or a combination of (1) an Add Value Station, which allows users to transfer funds. This function is not supported for PSX devices. (2) A Print Station, which lists all print jobs held in its associated Spool Queue and releases them for printing once payment arrangements are made at the terminal by the user who is the job owner. (3) A Copy Station, which controls copying activity on a single adjacent photocopier. To change the services a Network Terminal offers, click the editing button at the end of this field. This opens the Network Terminal Type dialog, where one or more services may be selected. Check the boxes for the service(s) you want this Network Terminal to offer and click OK. This setting is preferably Print/Copy for Xerox EIP-enabled MFDs.
Terminal Type—this is a read-only property displaying the type of the selected Network Terminal. For PSX devices, this property should display "Omega PSX".
Bank—Pharos® Banks detail the logon method and billing method used by the Network Terminal. Each device handles one billing method, so multiple devices should be provided if more than one billing method is offered to users. By default, all Network Terminals are associated with the Default Bank.
Related Printers—this property is available if the Network Terminal is designated as a Print Station. Select the MFP that the PSX terminal releases print jobs to.
Print Server—each PSX is controlled by a Pharos Print Server, which controls the printing system and user authentication.
MFD Poll Period—this property is available when the PSX device is acting as a Copy Station, and both Pharos® Off-The-Glass® and Pharos® Uniprint® are licensed. The polling period defines the frequency with which Omega polls the Print Server to see if the MFD it is connected to is available for copying. The default value is 3 seconds, although the values may be used. This means that every 3 seconds, PSX polls the Print Server to which it is connected.
Copier—this read-only property is available if the Network Terminal is designated as a Copy Station. The copying device controlled by this Network Terminal is displayed here. Network Terminals are configured to control only one copier.

Turning now to the configuration Options in Pharos Blueprint® Administrator, PSX terminals are configured on the Device Management>Terminals screen in Blueprint Administrator. Terminal settings are split across two tabs. It should be noted that the PSX configuration schema may be applied to the Blueprint Database to add the "PSX" terminal type and its associated configurable properties. The following configuration options may be used:
Terminal—a unique identifier for the terminal. This name may be entered on the Settings>LAN Address screen in PSX Administrator.
Install Date—a read-only property showing the date and time that the terminal was added to the Blueprint system.
Description—Descriptive text giving more information about the terminal. It is displayed in Blueprint Administrator.

Network Address—a read-only property showing the terminal's host name, or IP address if the host name is not known.

Terminal Type—this is a read-only property displaying the device's terminal type. For PSX terminals, this property should display "PSX".

Server—a read-only property showing the local server that the device is assigned to.

Terminal Features—select the output applications supported by the terminal's type (e.g., "Copy Tracking" and "Secure Release Here").

Secure Print—this property is enabled if the "Secure Release Here" terminal feature is ticked. Choose whether secure printing through this terminal should be Mandatory or Optional. If security is optional, the user may configure the device associated with the terminal to specify which device queues are secure and which are not. This is done on the Queues tab of the Devices screen.

Script—the authentication script that the terminal uses to authenticate users. Scripts are added and edited on the Authentication Scripts screen in the Device Management section.

Device—the device that the terminal releases print jobs to.

The PSX Administrator web application may be used to monitor and configure PSX devices remotely from a PC. From PSX Administrator the following exemplary operations may be performed: change network settings; change EDI settings; view a log of user activity; upgrade PSX firmware; change the administrative password; change logging settings; download configuration files and upload new versions; and/or restart the device. These operations may be performed on one PSX device, or on some or all PSXs in the system in a single operation. The PSX Administrator may be viewed using an Internet or Web browser (e.g., Microsoft Internet Explorer 6.0 or later, Mozilla Firefox 2.0 or later, etc.)

Logging on to the PSX Administrator may be performed in the following manner:
1. Open a web browser and navigate to http://hostname:8080, where hostname is the network host name of the PSX AuthHub to be configured. (The default host name for a new AuthHub is omega-XXXXXX, where XXXXXX is the PSX's serial number).
2. On the logon screen, enter the PSX AuthHub's administrative password. By default, this password is "pharos". (You can change it after logging on).
3. If you want to use SSL, click the Secure Connection box.
4. Click Log on.

To upgrade PSX firmware, the latest firmware releases are available from the Pharos website. Once downloaded from the Pharos website, firmware upgrades can be applied from the PSX Administrator web application. To upgrade firmware, the following steps may be performed:
1. Extract the firmware ZIP file to a temporary directory
2. Open PSX Administrator by browsing to http://hostname:8080, where hostname is the hostname of the PSX AuthHub you want to upgrade.
3. Click Upgrade from the System menu on the left.
4. Browse to the file cfs.bin, located in the AuthHub subdirectory under the temporary directory to which the firmware ZIP file was extracted.
5. Click the Upgrade Selected button.

The PSX AuthHub connects to the network and to the EIP-enabled printer/MFD it controls. The AuthHub acts as a firewall for the printer it controls. That is, network communication for the printer is sent to the PSX AuthHub's IP address, and the printer is "hidden" from the network. In other words, communications with the printer via the Web are isolated from the network server(s). The PSX AuthHub automatically assigns an IP address 192.0.2.2 to the printer using its own DHCP. For the PSX-controlled device to work with the PSX AuthHub, the controlled device should be configured to use DHCP. For printers that are to be configured statically, the following network values are used: IP address=192.0.2.2; Netmask=255.255.255.252; Gateway=192.0.2.1.

By default, the AuthHub accepts communications from the Pharos EDI Server. There may be other PCs or computers that need to communicate with the MFP, however. The Firewall Settings screen in the PSX Administrator allows for this. If the Print Server that sends jobs to the PSX-controlled MFP is on the same computer as the EDI Server, these jobs will get through. If the Print Server is on a different computer, it will not be able to send jobs to the MFP. The Print Server's host name or IP address may be specified in the Firewall>Servers property to allow jobs to get through. Other computers may be allowed to connect to the MFP. This feature is intended for use when printing devices are administered from a central server, which may be a different PC from the EDI Server or Print Server, for example.

The PSX AuthHub redirects network communications as follows. Requests sent on ports 8080 or 8443 (HTTP or HTTPS) are handled by the PSX AuthHub. Further, requests on other ports are routed directly to the printer (including pings).

The PSX automatically captures the attached printer's MAC and host name, and presents them as its own to the network for DHCP enabled printers and DHCP enabled sites (although this may be done with other protocols besides DHCP as well in some embodiments). The capture happens when the attached printer is restarted as a DHCP client after being connected to the PSX on port LAN1. When installing the PSX, it is recommended to power down the Xerox printer, power up the PSX, and then power on the Xerox printer, in that order. This helps ensure that the PSX will properly capture the printer's DHCP request.

Once the PSX is fully configured and installed on an EIP-enabled printer, it is ready for use. The user workflow is basically a matter of User Authentication, Service selection (Secure Release, Copying, etc.) and finally De-authentication (Log off). All interaction between the PSX and the user may be performed on the EIP-enabled device itself using the printer's integrated touch screen.

Due to the range of different displays presented by the line of Xerox® EIP-enabled printers, the user experience will differ slightly depending upon which printer is being used. The examples described below with reference to FIGS. 10-13 are for the Xerox® 56xx line of printers, but the overall experience will be similar with printers having differing display types.

Figure 10:
Figure 11:
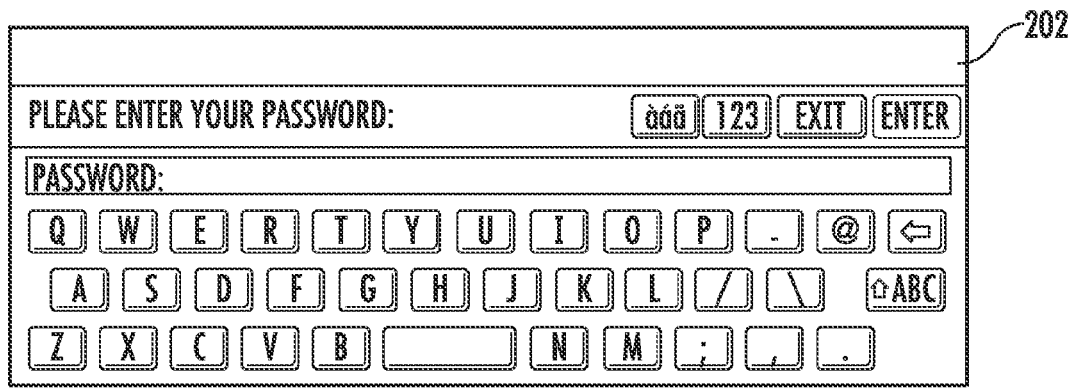
Figure 14:
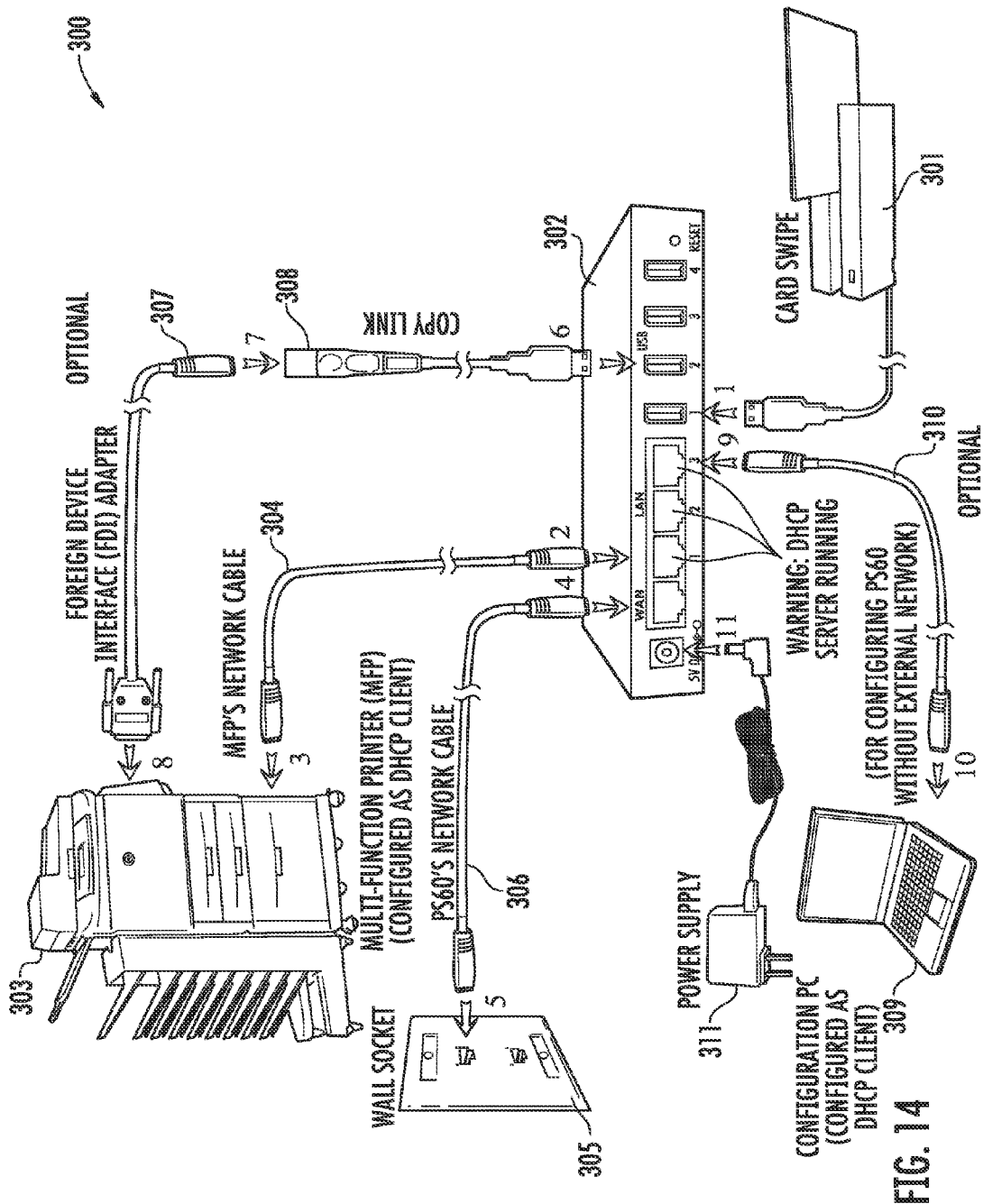
FIG. 14 is a schematic diagram illustrating steps for connecting an exemplary printer control device within a computer network in accordance with an exemplary embodiment of the invention.

When a user walks up to the EIP-enabled printing device, he will be presented with the log-on screen 200 (FIG. 10). This screen has a title, some instructional text and possibly a "Keyboard Access" button. Depending upon how Secure Access was configured on the printer itself, the exact text on the display can differ and the "Keyboard Access" button may or may not be present. If the user touches the "Keyboard Access" button, a soft-keyboard screen 202 will appear prompting the user to enter his User ID (FIG. 11). Swiping of an authentication token or card (proximity or magnetic) obviates the need for a User ID (since this is indicated by the card), so, in that case, the User ID is not prompted for it. After the User ID is collected, the user may be prompted for a password (depending upon how the PSX terminal is configured in the Pharos system and whether the user has one). Again this is done by an on-screen soft-keyboard.

Once logged on, the user should see the list of Custom Services available. In order to release print jobs, the user should select the "Pharos Secure Release" soft-button on the touch-screen. This will launch Pharos Secure Release and display a release screen 204 (FIG. 12). Pharos Secure Release allows the user to release print jobs from the EIP-enabled printer. The workflow a user experiences will be slightly different when using a Uniprint® server, as opposed to a Pharos Blueprint® server, due to the cost-recovery features of Uniprint®. When using Uniprint®, the first thing a user will see when they enter Secure Release is a summary of their purses. Each purse the user has with a non-zero balance will be displayed along with a total. Once this is dismissed, the main Secure Release screen is shown.

On the left hand side of the screen, the user's print jobs will be displayed. Above this list is a series of buttons which allow various actions to be performed. Some of these buttons are available at all times, and some are only available when a job is selected from the list. The "Refresh" button will refresh the job list, getting any new jobs which have changed since the user entered the application (it will also remove any which may have been removed by the system). This button is always available. The "Print All" button will attempt to print all the jobs in the Job List. This button will always be available (as long as there are jobs in the list).

To select a job from the list, the user only needs to touch the item in the list. If the list of jobs is too big to be displayed on the screen 206, it will page the jobs over more than one screen (FIG. 13). This paging is controlled by an up/down arrow widget immediately to the right of the job list. Once a job is selected, the details about this job (including the owner, when the job was submitted for printing, how many pages and—in the case of a Uniprint® install—its cost).

The "Print" button will become available when a job is selected from the list. This will then print the selected job after which the job will be removed from the list. The cost of the job (which was displayed in the details on the right) will be debited from the user's account. If the user does not have enough money in his account to print the job, an error indicating so will be displayed to the user. If a job is protected (printed with a username/password by using Pharos® Popups) and the password is not the same as the user's password in the Pharos® Server, then the user will be prompted for the correct password for the job before allowing it to be printed.

The "Delete" button, also available only when a job is selected from the list, will delete the selected job from the list without printing it. If a job is protected (printed with a username/password by using Pharos® Popups) and the password is not the same as the user's password in the Pharos® Server, then the user will be prompted for the correct password for the job before allowing it to be deleted.

Additionally, the "Account" button allows the user to select a cost center to charge jobs against. This is done by selecting the desired cost center from the presented list. There may be multiple levels of selection needed to select a complete cost center. The user should make a selection from each level in the cost center list. Once selected, the user will return to the Secure Release screen.

When a user has selected a cost center, the user's balance is no longer displayed. Instead, the selected cost center is displayed. Any jobs printed or copied (see Making Copies below) will be charged against the selected cost center. The Account button is available when the given user is allowed to use cost centers. This setting is configured using the Pharos Administrator on the Uniprint server.

If using Pharos Blueprint® (instead of Uniprint®), no mention of cost or user balance is used. Instead, a slightly simplified version of the user interface is displayed. Otherwise, the application behaves as it does when configured against Uniprint®.

To log off, the user exits from the "Custom Services" screens of the EIP-enabled printer. This may be done by exiting any Custom Service (i.e. Pharos Secure Release) and then pressing the "Close" button on the "Custom Services" screen. This will bring the user to an "All Services" screen. Once at the "All Services" screen, the user can press the "Copy" button on the touch screen. This will bring the user to the Copy application. From there on, as long as the user has proper funds in their account for their copy job, copy functionality is presented seamlessly to the user as if the Pharos System was not even present. If the user runs out of funds (or does not have any to begin with), the Copy screen will halt all copying and the screen will signal that access control has been triggered and value should be added.

Mounting possibilities for the PSX components depend in part on the dimensions of the MFP, and the location of connection ports on the MFP and surroundings. The AuthHub may be attached to the side of the MFP, or to a wall or bench, for example. Many types of MFDs have a hollow compartment at the back of the output device. If such a compartment is available, the AuthHub may be placed inside the MFP. If security is an issue, and a secure compartment in the MFP is not available, the AuthHub and power supply may be placed inside a lockable enclosure.

An exemplary connection configuration is now described with reference to a network configuration 300 shown in FIG. 11. A card reader 301 is first connected to a PSX AuthHub 302, such as via a USB port in the housing of the AuthHub. Next, an EIP-enabled printer 303 (e.g., MFP) is connected to the AuthHub 302 via a network cable 304, and the AuthHub is in turn connected to the network via a network socket 305 and network cable 306. The printer 303 may optionally also be connected to the AuthHub 302 via a foreign device interface (FDI) cable and CopyLink 308 adapter, if necessary, as discussed above. An optional connection to a configuration computer 309 via a network cable 310 (or USB cable, etc.), may also be used in embodiments where the AuthHub is being configured without an external network, as will be discussed further below. The AuthHub 302 may then by connected to a power source (e.g., wall outlet) via a power supply 311.

Upon connection of the components as noted above, the printer 303 is set up as a DHCP client. The printer 303 and AuthHub 302 are restarted (i.e., power is turned on), with the PSX preferably being powered on first. When the Print LED and network LED on the AuthHub 302 turns on and stays on, the AuthHub may be configured using the appropriate Administrator Web page. For a DHCP site, the user browses to http://[printer's_IP_Address]:8080 from any computer on the WAN network. For a non-DHCP site or copy only station, the configuration computer 309 is used, and the computer's network client is set to DHCP client. The computer 309 network is restarted, and the user browses to http://192.0.2.5:8080 using the default password, as noted above.

Many modifications and other embodiments of the invention will come to the mind of one skilled in the art having the benefit of the teachings presented in the foregoing descriptions and the associated drawings. Therefore, it is understood that the invention is not to be limited to the specific embodi- That which is claimed is:

1. A computer network comprising:
   a network server;
   a network printer having a printer identifier associated therewith;
   a plurality of network computers coupled to said network server for generating print jobs to be directed to said printer based upon the printer identifier, each print job having a printing permission level associated therewith; and
   a printer control device coupled between said network server and said network printer and configured to
      determine the printer identifier associated with said network printer based upon printer communications,
      masquerade the printer control device to said network server as said network printer by providing the printer identifier to said network server to access the print jobs from said network computers, and
      selectively enable printing of the print jobs by said network printer based upon the respective printing permission levels associated therewith.

2. The computer network of claim 1 wherein said printer control device determines the printer identifier based upon Dynamic Host Control Protocol (DHCP) communications with said network printer.

3. The computer network of claim 1 wherein said printer control device determines the printer identifier based upon querying the network printer using a Simple Network Management Protocol (SNMP).

4. The computer network of claim 1 wherein said printer control device determines the printer identifier based upon monitoring communications between said network server and said network printer.

5. The computer network of claim 1 wherein the printer identifier comprises an Internet Protocol (IP) address.

6. The computer network of claim 1 wherein the printer identifier comprises a Media Access Control (MAC) address.

7. The computer network of claim 1 wherein the printer identifier comprises at least one of a network name and a network gateway.

8. The computer network of claim 1 wherein said network server comprises a network print server configured to queue the print jobs for said network printer.

9. The computer network of claim 1 further comprising a token reader coupled to said printer control device and cooperating therewith to enable said network printer for printing.

10. A printer control device to be coupled between a network server and a network printer having a printer identifier associated therewith, the printer control device comprising:
    a printer interface module and a network interface module cooperating therewith to
       determine the printer identifier of the network printer based upon printer communications,
       masquerade the printer control device to the network server as the network printer by providing the printer identifier to the network server to access print jobs generated by network computers coupled to the network server, each print job having a printing permission level associated therewith, and
       selectively enable printing of the print jobs by the network printer based upon the respective printing permission levels associated therewith.

11. The printer control device of claim 10 wherein said printer access module and said network interface module cooperate to determine the printer identifier based upon Dynamic Host Control Protocol (DROP) communications with the network printer.

12. The printer control device of claim 10 wherein said printer access module and said network interface module cooperate to determine the printer identifier based upon querying the network printer using a Simple Network Management Protocol (SNMP).

13. The printer control device of claim 10 wherein said printer access module and said network interface module cooperate to determine the printer identifier based upon communications between the network server and the network printer.

14. The printer control device of claim 10 wherein the printer identifier comprises at least one of an Internet Protocol (IP) address and a Media Access Control (MAC) address.

15. A method for using a printer control device coupled between a network server and a network printer having a printer identifier associated therewith, the method comprising:
    determining the printer identifier of the network printer based upon printer communications;
    masquerading the printer control device the network server as the network printer by providing the printer identifier to the network server to access print jobs generated by network computers coupled to the network server, each print job having a printing permission level associated therewith; and
    selectively enabling printing of the print jobs by the network printer based upon the respective printing permission levels associated therewith.

16. The method of claim 15 wherein determining comprises determining the printer identifier based upon Dynamic Host Control Protocol (DHCP) communications with the network printer.

17. The method of claim 15 wherein determining comprises determining the printer identifier based upon querying the network printer using a Simple Network Management Protocol (SNMP).

18. The method of claim 15 wherein determining comprises determining the printer identifier based upon communications between the network server and the network printer.

19. The method of claim 15 wherein the printer identifier comprises at least one of an Internet Protocol (IP) address and a Media Access Control (MAC) address.

20. A non-transitory computer-readable medium having computer executable instructions for causing a printer control device, coupled between a network server and a network printer having a printer identifier associated therewith, to perform steps comprising:
    determining the printer identifier of the network printer based upon printer communications;
    masquerading the printer control device to the network server as the network printer by providing the printer identifier to the network server to access print jobs generated by network computers coupled to the network server, each print job having a printing permission level associated therewith; and
    selectively enabling printing of the print jobs by the network printer based upon the respective printing permission levels associated therewith.

21. The non-transitory computer-readable medium of claim 20 wherein determining comprises determining the printer identifier based upon Dynamic Host Control Protocol (DHCP) communications with the network printer.

22. The non-transitory computer-readable medium of claim 20 wherein determining comprises determining the printer identifier based upon querying the network printer using a Simple Network Management Protocol (SNMP).

23. The non-transitory computer-readable medium of claim 20 wherein determining comprises determining the printer identifier based upon communications between the network server and the network printer.

24. The non-transitory computer-readable medium of claim 20 wherein the printer identifier comprises at least one of an Internet Protocol (IP) address and a Media Access Control (MAC) address.

* * * * *